US006978932B2

(12) United States Patent
Margolis

(10) Patent No.: US 6,978,932 B2
(45) Date of Patent: Dec. 27, 2005

(54) APPARATUS FOR CONVERTING AN ENVELOPE FEEDING MACHINE INTO AN INTERNET CONNECTED POSTAGE MACHINE

(76) Inventor: Sheldon Margolis, 3579 Oriole Rd., Huntingdon Valley, PA (US) 19006

( * ) Notice: Subject to any disclaimer, the term of this patent is extended or adjusted under 35 U.S.C. 154(b) by 113 days.

(21) Appl. No.: 10/661,136

(22) Filed: Sep. 12, 2003

(65) Prior Publication Data

US 2004/0144844 A1 Jul. 29, 2004

Related U.S. Application Data

(63) Continuation-in-part of application No. 09/561,140, filed on Apr. 28, 2000, now abandoned.

(51) Int. Cl.[7] ................................................ G06F 3/12
(52) U.S. Cl. ........................ 235/432; 705/60; 705/408; 705/410; 358/1.6; 347/14; 347/16; 347/23; 347/108; 347/212; 347/238
(58) Field of Search .......................... 235/432; 705/60, 705/408, 410, 400, 406; 358/1.6; 347/14, 347/16, 23, 108, 212, 238

(56) References Cited

U.S. PATENT DOCUMENTS

| | | | | |
|---|---|---|---|---|
| 4,168,533 A | | 9/1979 | Schwartz | 364/900 |
| 5,126,753 A | | 6/1992 | Martin et al. | 346/1.1 |
| 5,189,442 A | | 2/1993 | Herbert | 346/140 |
| 5,200,903 A | | 4/1993 | Gilham | 364/464 |
| 5,326,181 A | * | 7/1994 | Eisner et al. | 400/104 |
| 5,467,709 A | | 11/1995 | Salomon | 101/93 |
| 5,638,098 A | * | 6/1997 | Iwata et al. | 347/9 |
| 5,657,689 A | | 8/1997 | Lee | 101/91 |
| 5,696,685 A | | 12/1997 | Lee et al. | 364/464.18 |
| 5,696,829 A | | 12/1997 | Cordery et al. | 380/55 |
| 5,730,049 A | | 3/1998 | Broschart | 101/91 |
| 5,781,708 A | * | 7/1998 | Austin et al. | 358/1.6 |
| 5,848,401 A | | 12/1998 | Goldberg et al. | 705/408 |
| 5,898,785 A | | 4/1999 | Cornell et al. | 380/51 |
| 5,969,735 A | | 10/1999 | Haigo | 347/85 |

(Continued)

FOREIGN PATENT DOCUMENTS

EP 0 881 599 A2 1/1998

(Continued)

OTHER PUBLICATIONS

Website: e-stamp.com, printed on Jan. 18, 2001.

(Continued)

*Primary Examiner*—Karl D. Frech
*Assistant Examiner*—Allyson N Trail
(74) *Attorney, Agent, or Firm*—Woodcock Washburn LLP

(57) ABSTRACT

Methods and apparatus are disclosed for using existing envelope feeding machines to print IBIP indicium, and CASS approved address information and bar code information. The invention is shown to include a print head operative in response to a print signal and a controller, electrically connected to the print head, for generating the necessary print signal. A frame defining a printing attachment mechanism adapted for being positioned proximate the feeding machine is provided for attachment of the print head oriented so that envelopes traveling along the feed path will pass proximate the print head. It is preferred for the printing attachment mechanism to include a plurality of print heads. In an alternative embodiment, the controller is operative in response to a control signal and a computer is provided for generating the control signal. In such an embodiment, the computer includes a modem and programming for enabling the computer to receive postage related communications via a network and for generating the control signal in response to such postage related communications.

3 Claims, 6 Drawing Sheets

U.S. PATENT DOCUMENTS

| | | | | |
|---|---|---|---|---|
| 5,978,781 | A | 11/1999 | Sansome | 705/408 |
| 6,004,048 | A | 12/1999 | Moh et al. | 400/70 |
| 6,010,156 | A | 1/2000 | Block | 281/2 |
| 6,024,429 | A | 2/2000 | Coffy et al. | 347/7 |
| 6,026,385 | A | 2/2000 | Harvey et al. | 705/408 |
| 6,029,137 | A | 2/2000 | Cordery et al. | 705/1 |
| 6,035,291 | A | 3/2000 | Thiel | 705/408 |
| 6,039,257 | A | 3/2000 | Berson et al. | 235/468 |
| 6,045,278 | A | 4/2000 | Kubatzki et al. | 101/93 |
| 6,064,994 | A | 5/2000 | Kubatzki et al. | 705/410 |
| 6,116,715 | A | 9/2000 | Lefebvre et al. | 347/19 |
| 6,154,733 | A | 11/2000 | Pierce et al. | 705/408 |
| 6,173,274 | B1 | 1/2001 | Ryan, Jr. | 705/408 |
| 6,182,566 | B1 | 2/2001 | Kubatzki et al. | 101/93 |
| 6,188,996 | B1 | 2/2001 | Sansone | 705/408 |
| 6,240,403 | B1 * | 5/2001 | Shah et al. | 705/408 |
| 6,334,119 | B1 | 12/2001 | Gagliardi et al. | 705/60 |
| 6,456,987 | B1 | 9/2002 | Pauschinger | 705/408 |
| 6,466,921 | B1 | 10/2002 | Cordery et al. | 705/60 |
| 6,467,688 | B1 * | 10/2002 | Goldman et al. | 235/472.01 |
| 6,612,675 | B1 * | 9/2003 | Takahashi | 347/16 |
| 6,613,998 | B2 * | 9/2003 | DeWitt et al. | 209/583 |
| 6,816,845 | B2 * | 11/2004 | Dolan et al. | 705/406 |
| 6,832,213 | B2 * | 12/2004 | Freeman et al. | 705/410 |
| 2002/0046182 | A1 | 4/2002 | Bator et al. | 705/60 |
| 2002/0057300 | A1 * | 5/2002 | Baker et al. | 347/2 |
| 2002/0059145 | A1 | 5/2002 | Leon | 705/60 |
| 2002/0073052 | A1 * | 6/2002 | Katikaneni et al. | 705/408 |
| 2002/0198852 | A1 * | 12/2002 | Freeman et al. | 705/410 |
| 2004/0010477 | A1 * | 1/2004 | Ballurkar et al. | 705/408 |
| 2004/0215581 | A1 * | 10/2004 | Lord et al | 705/400 |
| 2004/0215582 | A1 * | 10/2004 | Manduley | 705/408 |
| 2004/0215583 | A1 * | 10/2004 | Elliott | 705/408 |
| 2004/0223046 | A1 * | 11/2004 | Omae et al. | 347/238 |
| 2005/0110818 | A1 * | 5/2005 | Sakakibara et al. | 347/16 |

FOREIGN PATENT DOCUMENTS

| | | |
|---|---|---|
| EP | 0 933 730 A2 | 1/1999 |

OTHER PUBLICATIONS

Website: stamps.com, printed on Jan. 18, 2001.

Website: usps.com (U.S. Postal Service), printed on Jan. 18, 2001.

* cited by examiner

Printing: Barcode franking,stamps,indicica,ibip,logos
Name & Addresses,Address barcode, etc.
Print speed: until 1 meter a second.
Either remote controller,controlled by Pc, or printing from prepayed forms.

FIG. 6
FIM MARK
RATE CATEGORY
POSTAGE AMOUNT
DATE OF MAILING
DEVICE ID/TYPE
US Postage
First-Class
$0.33
August 9, 1999
Washington, DC 30260
Device 12345678901234
TWO DIMENSIONAL BARCODE
LICENSING POST OFFICE/
MAILED FROM ZIP CODE

APPARATUS FOR CONVERTING AN ENVELOPE FEEDING MACHINE INTO AN INTERNET CONNECTED POSTAGE MACHINE

CROSS-REFERENCE TO RELATED APPLICATIONS

This application is a continuation-in-part and claims priority under 35 U.S.C. §120 to U.S. patent application Ser. No. 09/561,140 filed Apr. 28, 2000 now abandoned, which is herein incorporated by reference.

FIELD OF THE INVENTION

The invention relates generally to the field of envelope processing equipment and, more particularly, to equipment for printing indicium onto an envelope such as that authorized by the Information Based Indicia Program (IBIP), address information and CASS approved bar code information.

BACKGROUND OF THE INVENTION

United States Postal Service (USPS) approved postage meters for use by the public have a long history in American business. Typical postage meters are capable of sealing and metering a particular item to be mailed. Postage meters are utilized in lieu of postage stamps as a means for printing a USPS approved indication of paid postage (indicium) on a mailpiece. Additionally, mailing machines which perform some or all of the functions of transporting, separating, sealing, and weighing mailpieces at a high throughput are also known. When a mailing machine is combined with a postage meter so that the mailpieces being processed through the mailing machine have the indicium printed thereon, a mail handling system is created.

In recent years, the technological advancement in digital printing techniques has led to the use of digital printheads in postage meters for printing the indicium and other information on mailpieces. Digital printers, such as ink jet or laser printers, provide advantages over previously used rotary drum printing systems in that they are readily adaptable to print various images simply through the use of new or upgraded software. Digital postage meters, however, require the consumer to invest in new, typically more expensive, equipment. As of 1996, there were approximately 1,500,000 postage meters in use in the United States. It would be a tremendous waste of resources if each of those existing meter machines needed to be replaced in order to gain the benefits of digital printing.

Relatively recently, the USPS has introduced the Information Based Indicia Program (IBIP). The IBI, like other forms of postage such as stamps and meter impressions, is printed on an envelope in the upper right hand corner, or on a label for an envelope or package. The indicium conveys evidence that postage has been paid and contains mail processing data requirements. Additionally, the indicium contains security-related data elements. An example of IBI can be seen in FIG. 6. The printing of such indicium is particularly well suited for digital printing devices. However, again, the problem remains that conversion of over one million meter machines to digital printing requires either substituting a digital printer, such as that used with a personal computer, or, purchasing an all new digital mailing system.

Another relatively recent development is generating significant change in the way postage is both purchased and supplied, namely via the internet. Not only can postage be purchased from the USPS via the internet, but also, postage can be purchased from approved USPS vendors such as stamps.com, estamps and Pitney Bowes. The problem with purchasing postage from certain of these organizations is that such a purchase can only be used in conjunction with a computer printer such as a conventional laser jet or ink jet-type printer. Accordingly, the ability to process mail will be limited to the speed at which the printer operates. In many instances this speed is six envelopes per minute, for example printers sold by manufacturers such as Cannon, Hewlett Packard and Lexmark. Such a speed is prohibitively slow for most businesses.

Conventional postage meters can also include a postal security device that maintains an accounting of available postage, purchased from the USPS or other third parties, within the meter. The available postage can be replenished mechanically or electronically in various increments through the USPS or other approved third parties as required by the user. In the case of internet purchased postage, such security devices can be replenished via the internet. However, after each block of postage has been used, the device becomes inoperable until postage is replenished.

Consequently, a need exists for a device that is capable of digitally printing postage, can be internet enabled and which will not require the abandonment of existing mail systems.

SUMMARY OF THE INVENTION

The above described problems are resolved and other advantages are achieved in methods and apparatus for using either existing envelope feeding machines or a newly designed envelope feeding machine to print IBIP indicium, and CASS approved address information and bar code information. The invention is shown to include a print head operative in response to a print signal and a controller, electrically connected to the print head, for generating the necessary print signal. A frame defining a printing attachment mechanism adapted for being positioned proximate the feeding machine is provided for attachment of the print head oriented so that envelopes traveling along the feed path will pass proximate the print head. It is preferred for the printing attachment mechanism to include a plurality of print heads.

In an alternative embodiment, the controller is operative in response to a control signal and a computer is provided for generating the control signal. In such an embodiment, the computer includes a modem and programming for enabling the computer to receive postage related communications via a network and for generating the control signal in response to such postage related communications.

It is also preferred to incorporate a sensor positioned proximate the feed path for generating a detection signal when an envelope passes proximate the sensor. Such signal is used by either the computer or the controller to synchronize the operation of the printheads. It is especially preferred for that sensor to be a light sensitive sensor.

It is further preferred for an ink supply to be connected in fluid communication with the print heads, for supplying ink thereto.

BRIEF DESCRIPTION OF THE DRAWINGS

The foregoing summary, as well as the following detailed description of the preferred embodiments, is better understood when read in conjunction with the appended drawings.

For the purpose of illustrating the invention, there is shown in the drawings embodiments that are presently preferred, it being understood, however, that the invention is not limited to the specific apparatus, system, and instrumentalities disclosed. In the drawings.

DETAILED DESCRIPTION OF ILLUSTRATIVE EMBODIMENTS

Figure 1:
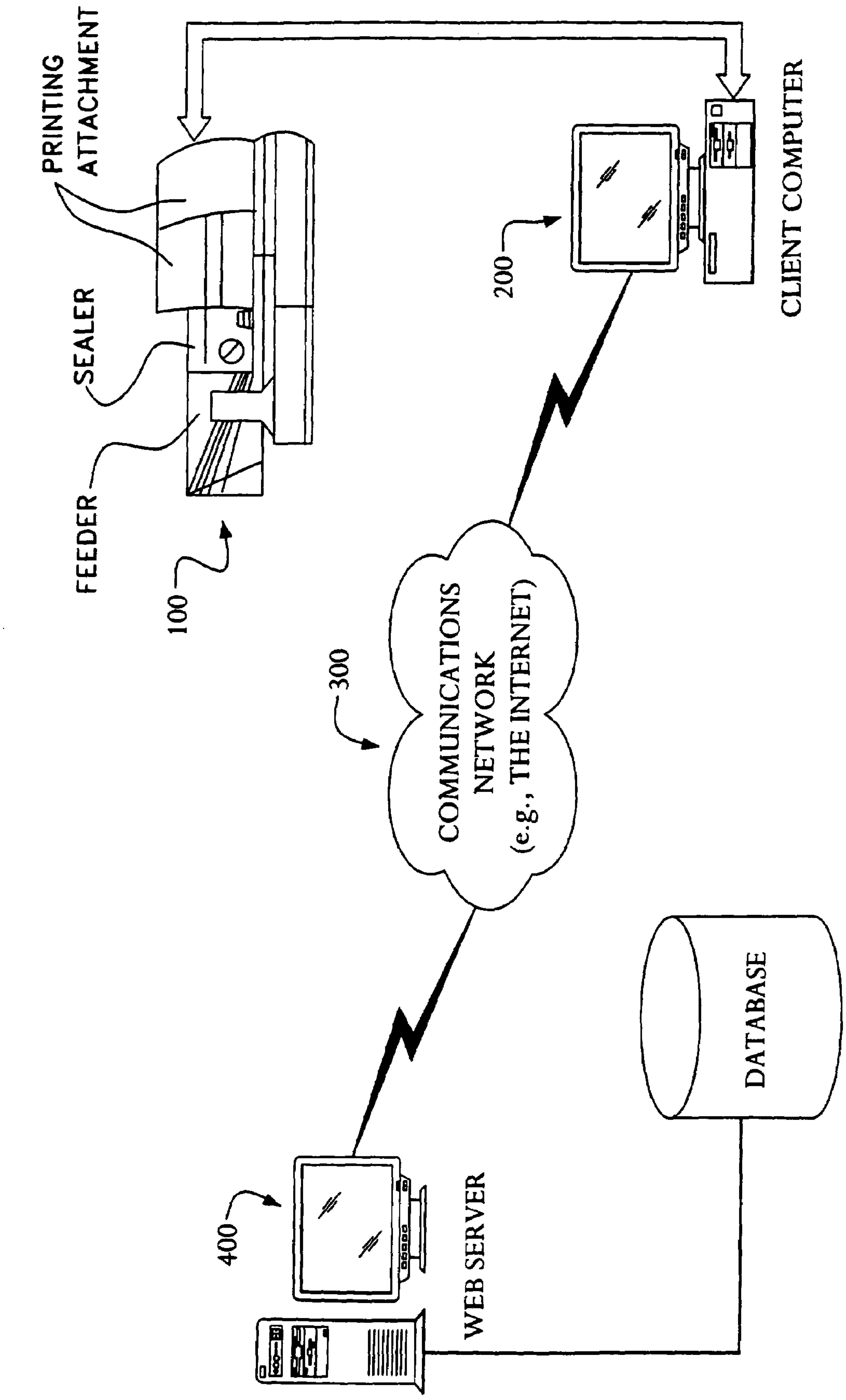
FIG. 1 is a diagrammatic view of a system constructed in accordance with the present invention for printing postage acquired over the internet.

One embodiment of a system for printing IBIP indicium on an envelope, which indicium has been derived from an approved USPS vendor such as stamps.com, estamps or Pitney Bowes is disclosed in FIG. 1. As such, the present invention can be used in either an open system—the postage for each envelope is authorized in real time or a closed system—the postage device, attached to the printer, is enabled remotely to dispense a fixed amount of postage. This last system is also referred to as a closed vaulted system, including a dongle vault.

As shown, envelope processing assembly 100 is formed from the combination of an existing envelope feeding base that has had its existing printing mechanism replaced with a printing attachment mechanism constructed in accordance with the present invention. The printing attachment mechanism is connected via cabling to computer 200. Computer 200, via any known modem device, is connected to communications network 300. Network 300 can be any known network, for example the internet or could also be a local area network connected to the internet or a wide area network. Network 300 serves to connect computer 200 with the web server 400 of an approved USPS vendor. It is noted, and as will be explained below, the internal electronic components and programming of computer 200 necessary to connect the printing attachment mechanism to network 300 can be included as a part of the printing attachment mechanism thereby obviating the need for computer 200.

Figure 2:
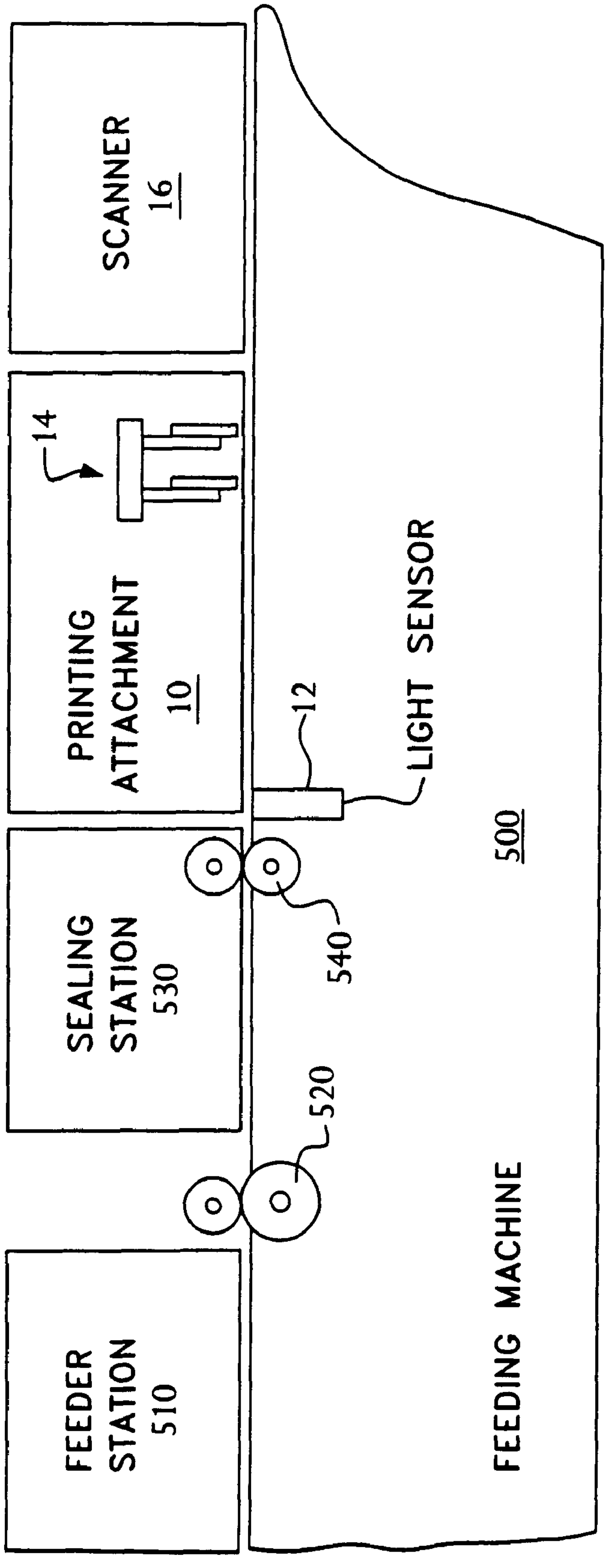
FIG. 2 is a diagrammatic view of a printing attachment constructed in accordance with the present invention for use with an existing envelope feeding mechanism.

Referring now to FIG. 2, there is generally depicted an existing feeding machine 500. Feeder 500 includes a feeder station 510 that operates to feed envelopes typically via gravity to a pair of feeder rollers 520. Rollers 520 are operative to pinch an envelope therebetween and move it towards sealing station 530. Sealing station 530 is operative to seal the envelope, by any known technique for moistening adhesive such as a brush and felt arrangement, a stainless steel and brass arrangement, a velcro and water supply combination, a liquid wicking system and the like. Envelopes are thereafter taken up by pinch rollers 540. In the past, the envelope would next pass to a printing station in which a barrel print head would print postage indicia onto the envelope.

Up to this point, already existing equipment has been described. There are many examples of such equipment, including the following products sold by Pitney Bowes of Stamford, Conn.: E680, E590, 5600, 5636, 5630, U560, U570, 6800 and 6105 (automatic) and E500, E510, E520, E530 and E600 (semi-automatic); Neopost of Haward, Calif.: 9130, 9180 and SM (automatic) and the SM48, SM50 and SM52 (semi-automatic); Ascom of Berne, Switzerland: 204AS and 300 Series AS (automatic) and 120, 202 and 204 (semi-automatic); and Frankotype-Postalia of Lisle Ill.: 7515, 8515 and the M3000 Autofeed (automatic) and 7500, 7512, 7513, 8500, 8512, 8513 and the M3000 base (semi-automatic). Several of these products are capable of handling up to 180 envelopes per minute.

As will become apparent from the description herein, the printer attachment mechanism of the present invention permits the consumer to use existing machine bases previously purchased for use with a traditional rented postage meters. Thus, the present invention enables consumer to benefit from technology advances without completely abandoning prior investments in mail processing equipment. It will also noted that use of the present invention with such existing bases, enables the consumer to achieve the envelope processing speeds available with such equipment.

Referring again to FIG. 2, the barrel printing mechanism of the prior equipment has been replaced with printing attachment mechanism 10. Preferably, mechanism 10 is constructed to fit within the existing "footprint" and to attach to existing structure used to attach the old print mechanism. Printing attachment mechanism, in response to the detection of an envelope by light sensor 12, causes print head assembly 14 to print appropriate indicia onto the envelope as it passes. It is also envisioned that printing attachment mechanism 10 can be used in conjunction with scanner 16. In such an embodiment, scanner 16 scans the printed envelope to ensure that the IBIP indicium has been properly printed. Thus it will be seen that use of the printing attachment of the present invention will allow IBIP printing and sealing of the envelope simultaneously using USPS approved vendors such as stamps.com.

Figure 3:
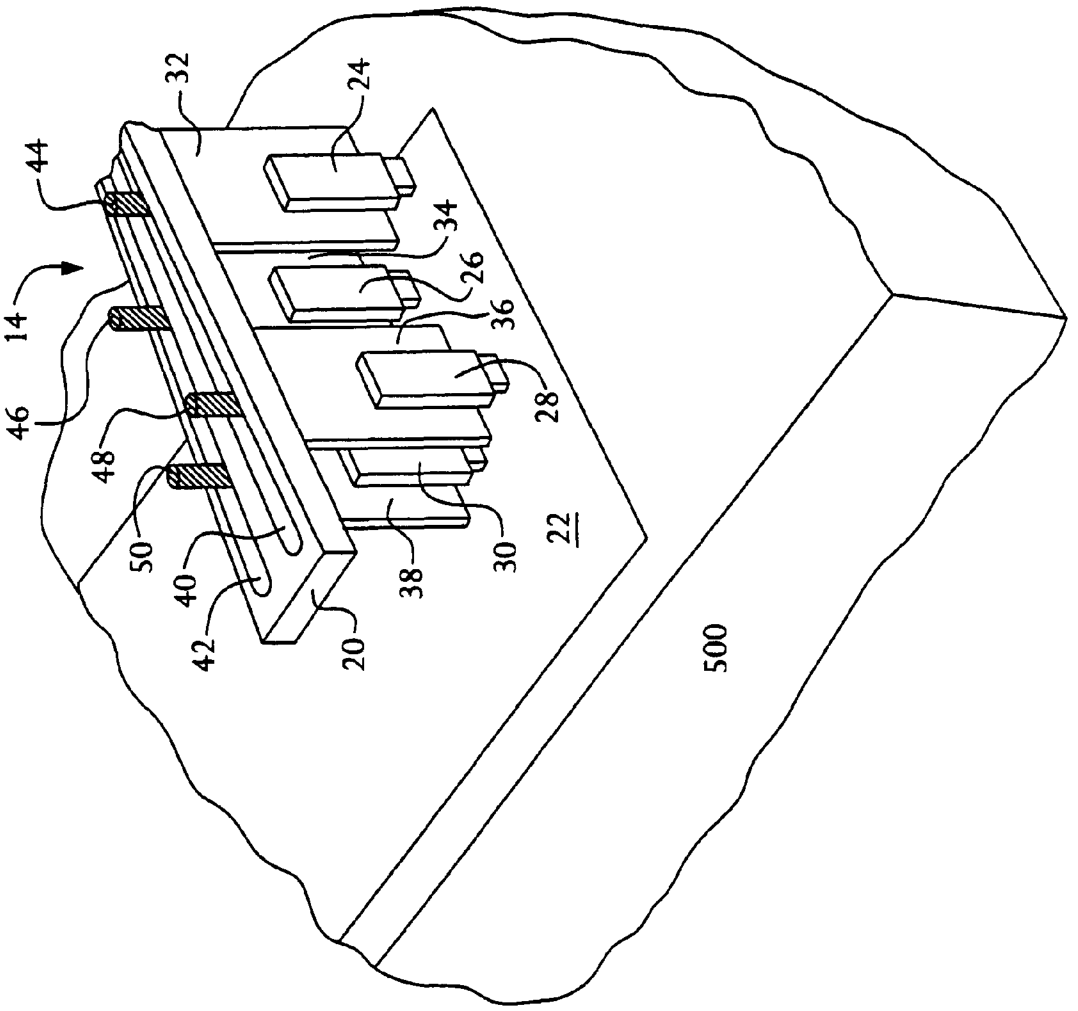
FIG. 3 is a partial perspective of a series of mounted printheads depicted diagrammatically in FIG. 2.

Referring now to FIG. 3, print head assembly 14 is described in greater detail. An arm 20 extends from the frame structure of printing attachment mechanism 10. It is noted that the exact details of the frame structure are not disclosed as they are not essential in order to practice the invention. It is only necessary that such structure is adapted to position arm 20 proximate the path in which envelope 22 travels. As indicated above, it is also preferred for the structure of mechanism 10 to fit into the footprint formerly occupied by the barrel printing mechanism.

As shown in FIG. 3, a number of print heads 24, 26, 28, and 30 are each mounted on support plates 32, 34, 36, and 38, respectively. The end of each print head 24–30 from which ink is ejected is oriented to extend a small distance from the end of support plates 32–38. It is preferred for print heads 24–30 to each be a Xaarjet 64 printhead presently sold by XaarJet of Cambridge, England. Such printheads are piezo-electric based devices capable of producing either 200 or 360 dots per square inch and capable of printing at linear speeds of from 0.39 to 0.54 m/sec. It is noted that such printheads will be connected to an appropriate ink supply (shown in FIG. 5). It is also preferred for such ink supply to be refillable.

In order to position printheads 24–30 over the envelope path, two slots 40 and 42 are formed in arm 20 such that the slots run the length of arm 20. Support plates 32–38 are attached to arm 20 via attachment screws 44, 46, 48 and 50. Attachment screws 44–50 have one end (shown in FIG. 3) formed to be slightly wider than slots 40 and 42. The other end of screws 44–50 (not shown) screws into an appropriately sized and threaded bore. While attachment screws are depicted, it is noted that no particular attachment or mounting structure need be used in order to practice the invention. It is only necessary that the attachment structure be sufficient to orient support plates 32–38 to position the ink ejection end of printheads 24–30 over the path of envelope 22. While the mechanical arrangement of printheads 24–30 has been described, it is noted that each of the printheads is also an electronic device which prints in response to a print signal.

Figure 4:
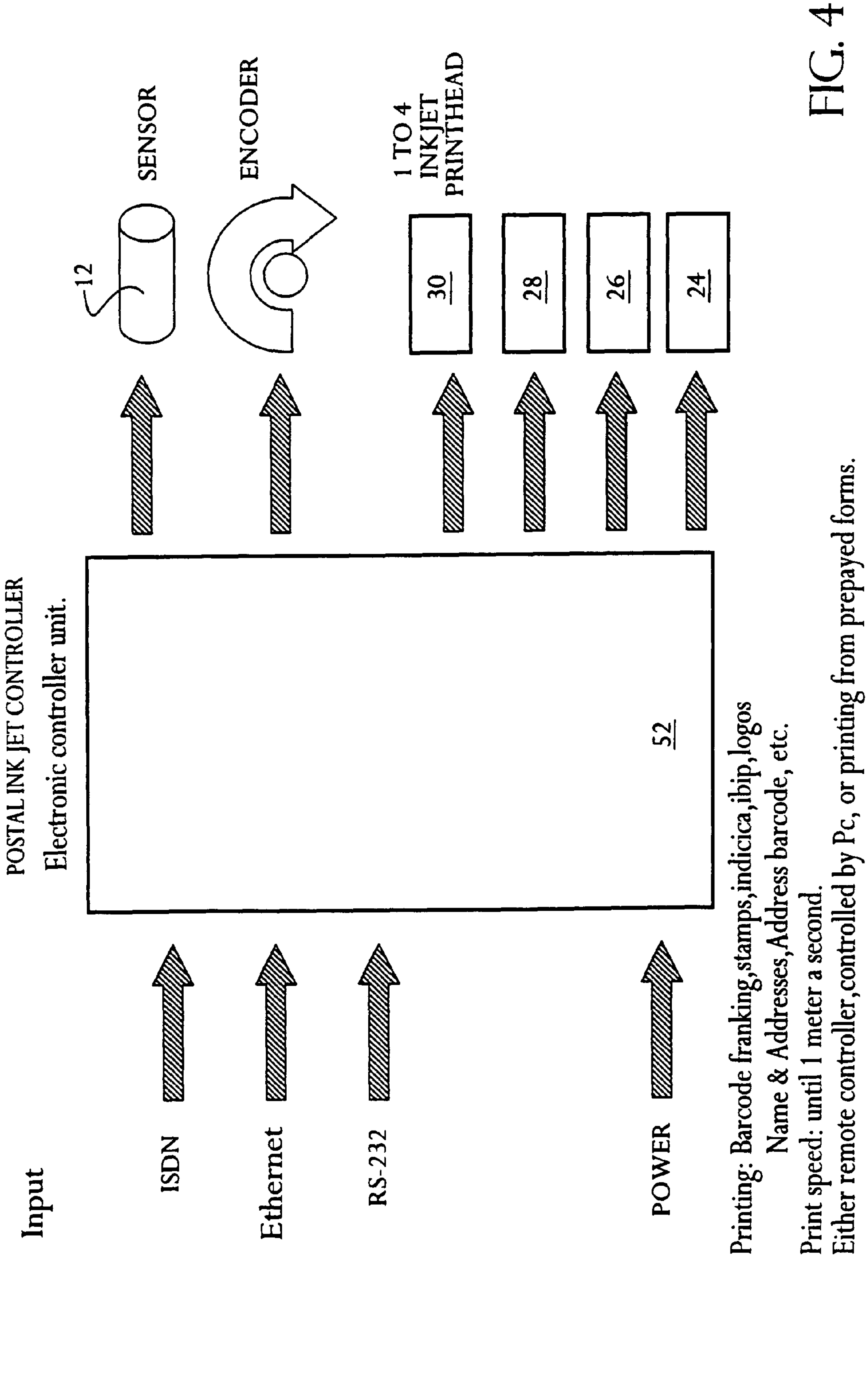
FIG. 4 is a diagrammatic view of a printing apparatus constructed in accordance with the present invention.

Referring now to FIG. 4, the electronic operation of printing attachment mechanism will be explained in greater detail. As shown in FIG. 4, the generation of an appropriate print signal is controlled by controller 52. As indicated previously, printing attachment 10 can either be constructed to attach to a separate computer or can be constructed to connect directly to network 300 (FIG. 100). To this end, controller is shown to be adapted to receive either an ISDN signal, an Ethernet signal or an RS-232 formatted signal. It is noted that no particular circuit arrangement is required to practice the present invention. It is only necessary for the print signals provided to printheads 24–30 be appropriate to cause the printing of acceptable IBIP, address or CASS approved bar code information on envelope 22. It is preferred for controller to include an FPGA programmable processing component.

Controller is also shown to be connected to receive the signals generated by sensor 12, in order to synchronize the energization of printheads 24–30 with the presence of envelope 22 proximate thereto.

Figure 5:
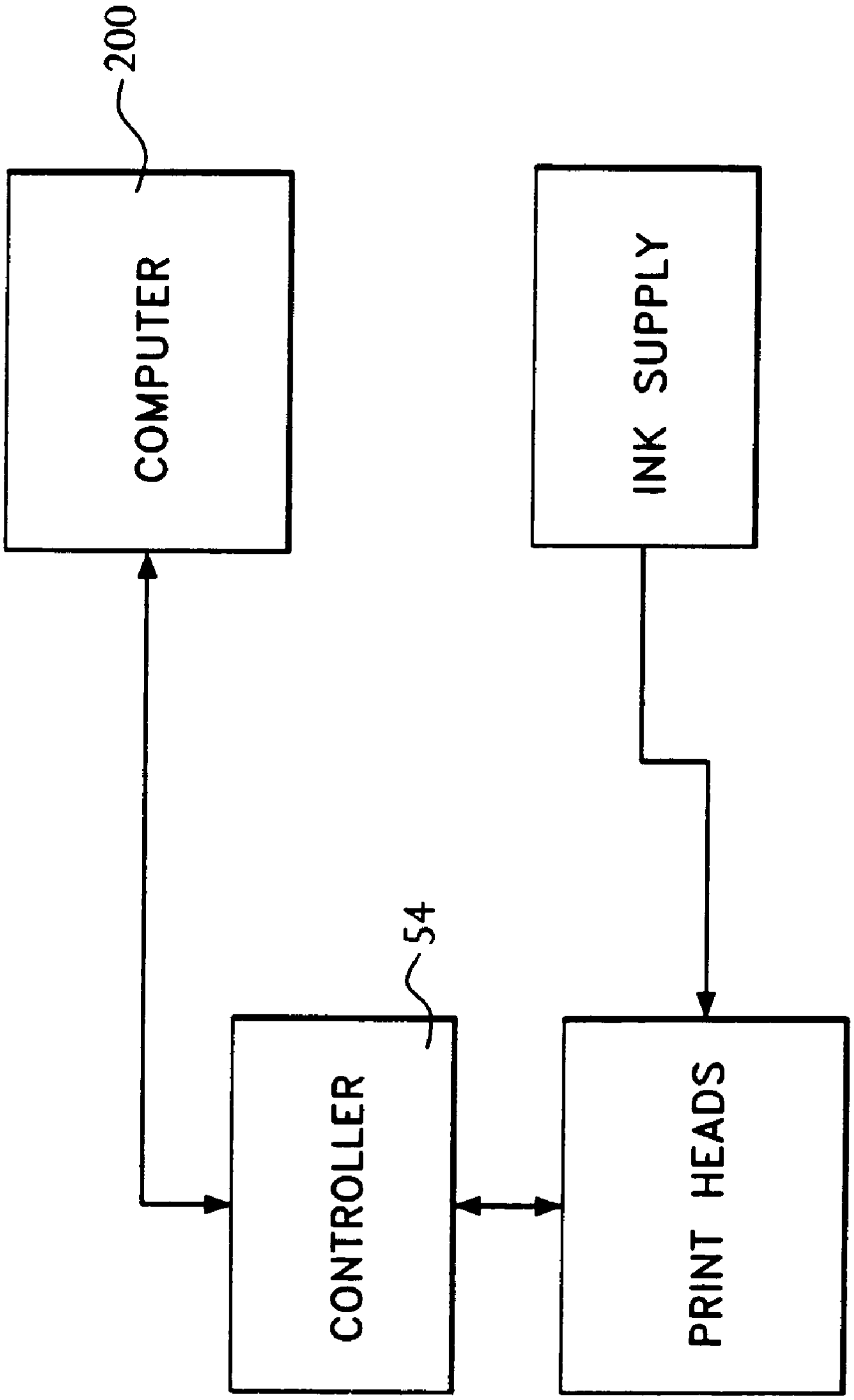
FIG. 5 is a partial diagrammatic view of an alternative embodiment of the printing apparatus depicted in FIG. 4.
Figure 6:
FIG. 6 is an example of IBIP indicium.

In an alternative embodiment, controller 52 operates in conjunction with computer 200 to generate the required print signaling. As shown in FIG. 5, a controller 54 is connected to the printhead array and to computer 200. In this embodiment, computer 200 would further connect to network 300. It is especially preferred, in this embodiment, for controller 54 to be constructed to connect directly into the card rack within computer 200.

It will be understood from the above that a method and apparatus has been disclosed for use with existing envelope feeding machines. To this end a print head, operative in response to a print signal, is provided to print on a substrate such as an envelope is caused to pass proximate the print head. To this end the mechanism already existing within the envelope feeding machine is used. A controller, electrically connected to the print head, generates the necessary print signal. A frame, adapted for being positioned proximate the feeding machine is utilized, wherein the print head is attached and oriented so that envelopes traveling along the feed path will pass proximate the print head thereby enabling indicia to be printed on the envelope.

A computer is used in one embodiment that includes a modem and programming for enabling the computer to receive postage related communications and for generating a control signal for processing by the controller in response to such postage related communications.

In this way print signals are generated enabling the printheads to print information based indicia program approved IBIP indicia on the envelope as well as address information together with CASS approved bar coding.

Because different postage systems operate at different speeds, the controller 52 may be provided with programming for handing the different operational speeds of the different postage systems. Also, a user interface may be provided to allow a user to program a particular speed setpoint to match one of the postage systems.

The controller 52 may determine when to begin printing the indicia based on an envelope detection signal generated by sensor 12. Sensor 12 may be positioned proximate the feed path of the envelope and may detect when the envelope is proximate the sensor 12. Sensor 12 may be an Omron adjustable light sensor. Controller 52 may receive a signal that the sensor 12 has detected the envelope and then send a print signal to the printheads 24–30. Also, there may be some known or variable delay before sending the print signal to the printheads 24–30 depending on the spacing between the printhead and the sensor, the speed of the postage system, and other factors.

In addition to controlling the print start time, the controller 52 may control the print speed so that the printed indicia does not appear condensed (in the case of an envelope moving slower than the printheads are printing) or expanded (in the case of an envelope moving faster than the printheads are printing). Controller 52 may control the print speed based an encoder mounted near the feed path that detects the envelope speed or may control the speed without using an encoder.

The encoder may generate a pulse for each increment of distance that the envelope or the feeding portion moves. This signal is transmitted to the controller 52 for use in controlling the print speed. For example, a user may configure the controller 52 (via a user interface such as a dash pot, a keypad, an LCD display, and the like) to print at 1 mm/pulse from the encoder. Given this setpoint from the user, controller 52 receives the pulses from the encoder and determines the print speed for the printheads based on the setpoint and the encoder pulses.

Alternatively, controller 52 may control the speed based on a user input without using the encoder. For example, a user may configure the controller 52 (via a user interface such as a dash pot, a keypad, and LCD display, and the like) to print at 1 mm/second. Given this setpoint from the user, controller 52 may use a clock signal and determine the print speed for the printheads based on the clock signal and the setpoint.

Because the controller 52 can print CASS approved bar coding, the controller 52 may also request and receive a reduced postage rate by confirming that the indicia includes CASS approved bar coding. Such reduced postage rates can be implemented by having a third party sort mail pieces based on the CASS approved bar coding before delivery to the U.S. Post Office. Once the mail pieces have been sorted by the CASS approved bar code, the U.S. Post Office may grant a reduced postage rate. Such a system allows many more users to take advantage of reduced postage rates.

While the invention has been described with reference to a preferred embodiment, it will be understood by those skilled in the art that various changes may be made and equivalents may be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. A method for retrofitting an existing mailing system, the existing mailing system comprising an existing printing portion, an existing metering portion, and an existing feeding portion that moves an envelope along a feed path, the method comprising:

removing the existing printing portion of the mailing system;

mounting a frame and a print head proximate the existing feeding portion so that the envelope traveling along the feed path will pass proximate the print head, the frame and print head being a different type from the removed existing printing portion;

mounting a sensor proximate the existing feeding portion, wherein the sensor senses that the feeding portion of the mailing system has positioned the envelope proximate the print head and provides a signal to a controller to begin printing postage amount indicia;

connecting the print head to the controller, wherein the controller is operable to generate a print signal to cause the print head to print postage amount indicia, the controller is operable to receive an indication that the controller is authorized to print a postage indicia, the controller is operable to cause the print head to print at various speeds; and adjusting the controller to cause the print head to print at a similar speed as the removed existing printing portion of the mailing system.

2. The method of claim 1, further comprising mounting an encoder proximate the existing feeding portion, wherein the encoder senses the speed of the feeding portion of the mailing system and outputs a signal based on the sensed speed.

3. The method of claim 1, wherein the controller comprises a computer card and the method further comprises:

removing the existing metering portion; and installing the controller in a computer having a network communication device, whereby the controller may receive authorization to print a postage amount indicia via the network communication device.

* * * * *